US005353594A

United States Patent [19]

Yamashita et al.

[11] Patent Number: 5,353,594

[45] Date of Patent: Oct. 11, 1994

[54] DRIVING MECHANISM OF A CIRCUIT BREAKER

[75] Inventors: Toru Yamashita; Yoshiki Hirano, both of Amagasaki, Japan

[73] Assignee: Mitsubishi Denki Kabushiki Kaisha, Tokyo, Japan

[21] Appl. No.: 51,096

[22] Filed: Apr. 22, 1993

[30] Foreign Application Priority Data

May 29, 1992 [JP] Japan ..................... 4-138227
Oct. 6, 1992 [JP] Japan ..................... 4-267124

[51] Int. Cl.[5] .............................. F16D 31/02

[52] U.S. Cl. .............................. 60/413; 60/426; 91/417 R; 91/361; 91/518; 91/532

[58] Field of Search .............................. 60/413, 420, 426; 91/41, 44, 45, 1, 416, 417 R, 361, 392, 410, 517, 518, 532, 533, 536

[56] References Cited

U.S. PATENT DOCUMENTS

| | | | |
|---|---|---|---|
| 2,877,787 | 3/1959 | Brueder | 91/536 |
| 3,847,059 | 11/1974 | Beck et al. | 91/532 X |
| 4,343,972 | 8/1982 | Bischofberger et al. | 91/417 R X |
| 4,716,812 | 1/1988 | Koerner et al. | 60/413 X |
| 4,785,712 | 11/1988 | Yoshizumi et al. | 91/417 R X |
| 4,838,145 | 6/1989 | Slocum et al. | 91/536 |
| 5,195,864 | 3/1993 | Drake et al. | 60/413 X |

FOREIGN PATENT DOCUMENTS

| | | | |
|---|---|---|---|
| 397682 | 1/1974 | U.S.S.R. | 91/536 |

*Primary Examiner*—Edward K. Look
*Assistant Examiner*—Hoang Nguyen
*Attorney, Agent, or Firm*—Oblon, Spivak, McClelland, Maier & Neustadt

[57] ABSTRACT

In a driving mechanism of a circuit breaker having first and second hydraulic operation apparatuses respectively driving a main contact and a resistor contact, a sequential control valve is provided between the first and second hydraulic operation apparatuses. The sequential control valve detects the operation of a differential piston for opening the main contact and switching the differential piston for sequentially opening the resistor contact after the opening of the main contact.

5 Claims, 12 Drawing Sheets

DRIVING MECHANISM OF A CIRCUIT BREAKER

BACKGROUND OF THE INVENTION

1. Field of the Invention

The present invention relates to a driving mechanism of a circuit breaker to be used in an electric power line system, and especially relates to a driving mechanism having two hydraulic operation apparatuses which drive a main contact and a resistor contact of the circuit breaker.

2. Description of the Prior Art

When the voltage of an electric power system becomes higher and the conventional circuit breaker is used, for example, in 1000 kv system, it is demanded to restrain an overvoltage not only in the closing operation but also in the breaking operation of the circuit breaker for making a transmission-transformation system and/or transmission lines economical. For restraining the overvoltage in the breaking operation too, a resistor-breaking type circuit breaker, which inserts a resistor contact after breaking the main contact and breaking the resistor contact after a predetermined time period, is necessary. For such a time period of the insertion time of the resistor contact, a computer simulation of the model system revealed that a time of about 25 ms is necessary. That is, a longer time period in comparison with that of 10 ms in the resister insertion operation.

On the other hand, the circuit breaker is requested to operate faster in the breaking operation than in the closing operation for obtaining a high circuit breaking performance, generally. For satisfying such a condition, it is necessary that the resistor contact is opened in the vicinity of the final step of the breaking operation after the main contact is opened. Therefore, other special driving apparatuses are demanded for driving the main contact and the resistor contact, independently.

A conventional circuit breaker with resistor contact is shown in FIG.9 which is a sectional side view schematically showing a typical constitution of the circuit breaker. In FIG.9, insulative gas such as $SF_6$ is filled in an inner space 201 of a tank 200. A series connection of a resistor 202 and a resistor contact 401 is connected in parallel with a main contact 1. The main contact 1 is coupled with a first differential piston 3 of a first hydraulic operation apparatus 4 via a first link mechanism 2, and the resistor contact 401 is coupled with a second differential piston 403 of a second hydraulic operation apparatus 104 via a second link mechanism 402. The first and second hydraulic operation apparatuses 4 and 104 are respectively provided outside the tank 200. The first link mechanism 2 is constituted by an insulative operation rod 2*a*, a link 2*b*, a rod end 2*c*, and so on. The second link mechanism 402 is also constituted by an insulative operation rod 402*a*, a link 402*b*, a rod end 402*c* and so on. Since the link mechanisms are well known in the art, they are schematically illustrated in the figure. As is obvious in the art, the insulative operation rods 2*a* and 402*a* are provided for slidably penetrating a shell of the tank 200 via gas-tight sealing elements from the inner space of the tank 200 to the atmosphere.

A conventional hydraulic operation apparatus, which is to be used as an actuator of the conventional driving mechanism of the circuit breaker, is described referring to FIGS. 10, 11 and 12. Such a conventional hydraulic operation apparatus is, for example, shown in Publication Gazette of Japanese Patent Application Sho 61-156613.

FIGS. 10 and 12 are sectional side views showing a constitution of the conventional first hydraulic operation apparatus. FIG. 11 shows timing charts of the operation of the conventional hydraulic operation apparatus. Since the second hydraulic operation apparatus has substantially the same constitution of the first hydraulic operation apparatus, only the explanation of the first hydraulic operation apparatus is described referring to the figures.

In FIGS. 10 and 12, a driving device 6 for driving the main contact 1 comprises a differential piston 3, a cylinder 5 and dashpot rings 24 and 74. An end 3a of the differential piston 3 is connected to the main contact 1 of the circuit breaker via a link mechanism 2. A first pressure chest 5*a* of the cylinder 5 which is positioned in a smaller piston area side of the differential piston 3 is connected to an accumulator 9 through a pipe line 10. A second pressure chest 5*b* of the cylinder 5 is positioned in a larger piston area side of the differential piston 3.

A main valve 7, which is used for controlling the driving device 6, is provided neighboring to the driving device 6. The main valve 7 consists of a main valve chest 7*a*, a feed valve 13 and an exhaust valve 14. The feed valve 13 comprises a compression spring 13*a*, a valve body 13*b* and a pilot chest 13*c*. The exhaust valve 14 also comprises a compression spring 14*a*, a valve body 14*b* and a pilot chest 14*c*. The pilot chest 13*c* is connected to the accumulator 9 through the pipe line 11. The main valve chest 7*a* is connected to the second pressure chest 5*b* of the cylinder 5 of the driving device 6. The valve bodies 13*b* and 14*b* are positioned to face to each other and coupled to move in one body.

An amplifier valve 8 comprises an amplifier valve chest 8*a*, a supplemental exhaust valve 19 and a supplemental feed valve 20. The supplemental exhaust valve 19 comprises a compression spring 19*a*, a valve body 19*b* and a pilot chest 19*c*. The supplemental feed valve 20 also comprises a compression spring 20*a*, a valve body 20*b* and a pilot chest 20*c*. The valve bodies 19*b* and 20*b* are positioned back to back each other and coupled to move in one body. The pilot chest 14*c* of the exhaust valve 14 of the main valve 7 and the amplifier valve chest 8*a* of the amplifier valve 8 are connected by a pipe line 16. As shown in FIG. 10, a pipe line 20*d* is provided on the valve body 20*b*, and thereby, the amplifier valve chest 8*a* and the pilot chest 20*c* is connected. Furthermore, pipe lines 12 and 51 are provided for connecting to the accumulator 9 and the amplifier valve chest 8*a* of the amplifier valve 8. The second pressure chest 5*b* of the cylinder 5 of the driving device 6 and the pilot chest 19*c* of the supplemental exhaust valve 19 is connected by pipe lines 71 and 77 and a restrictor 72. The second pressure chest 5*b* of the cylinder 5 is connected to the accumulator 9 through pipe lines 76, 11 and 10 and a restrictor 75.

A closing valve 38, which is to be used in closing operation of the circuit breaker, is configured in a manner to connected to a valve chest 38*a* and the accumulator 9 by pipe lines 12, 52 and 56 and a restrictor 54. Thereby, the high-pressure oil is supplied from the accumulator 9 to the closing valve 38. An opening valve 28, which is to be used in opening operation of the circuit breaker, is configured in a manner to connect to a valve chest 28*a* and the pilot chest 19*c* of the supplemental exhaust valve 19 by a pipe line 57. The valve chest 28*a* of the opening valve 28 is connected to a lower-pressure tank 18 through a pipe line 58. Furthermore, the lower-pressure tank 18 is connected to the exhaust valve 14 of the main valve 7 through a pipe line 17. The supplemental exhaust valve 19 is also connected to the lower-pressure tank 18 through a pipe line 22. The valve chest 38*a* of the closing valve 38 is also connected to the lower-pressure tank 18 through a pipe line 60.

The closing valve 38 comprises a ball-shaped valve body 29 and a compression spring 31. The opening valve 28 also comprises a ball-shaped valve 30 and a compression spring 32. The closing valve 38 is controlled by an electro-magnetic device 35 via an operation rod 33. The opening valve 28 is also controlled by another electro-magnetic device 36 via another operation rod 34. Each electro-magnetic device 35 or 36 comprises a moving core 35*a* or 36*a* and a stationary coil 35*b* or 36*b*, wherein the moving core 35*a* or 36*a* moves linearly by responding to magnetic force generated by the stationary coil 35*b* or 36*b*.

A pipe line 59 is branched from the pipe line 56. The pipe line 59 is connected to a closing operation control device 61. The closing operation control device 61 comprises a smaller piston 62 which is driven by the high-pressure oil supplied to the closing operation controlling device 61. A latch 63 is provided in the vicinity of the closing operation control device 61. The latch 63 is rotatably borne by a pivot 64 which is, for example, fixed on the cylinder 5. When the high-pressure oil is supplied to the closing operation control device 61, the piston 62 is driven to move leftward in FIG. 10, and the piston 62 pushes the back face of the latch 63. When the latch 63 has been pushed by the piston 62, the latch 63 can rotate. As shown in FIG. 12, when the latch 63 is engaged with a pin 50 which is provided on the differential piston 3, the engagement is maintained. The latch 63 has a specific shape in a manner that the latch 63 is automatically rotated in clockwise direction in FIG. 12 for releasing the engagement with the pin 50 by receiving thrust from the differential piston 3. When the pushing force of the piston 62 is removed, the latch 63 starts to rotate by the force from the differential piston 3.

The dashpot ring 74 is allowed to slightly move up and down along an inner surface of the cylinder 5. A circular groove 73 is provided on an outer periphery of the dashpot ring 74 for connecting to the pipe lines 76 and 77. When the dashpot ring 74 is pushed down by the differential piston 3, and oil-tightly seals the communication from the second pressure chest 5*b* of the cylinder 5, the high-pressure oil flows from the pipe line 76 to the pipe line 77 through the circular groove 73. On the other hand, when the dashpot ring 74 is not pushed down by the differential piston 3, and the pressure of the oil in the pipe lines 76 and 77 is larger than the pressure in the second pressure chest 5*b* of the cylinder 5, the dashpot ring 74 floats. Thereby, the second pressure chest 5*b* of the cylinder 5 and the pipe lines 76 and 77 are connected.

The opening operation of the contacts in the above-mentioned conventional driving mechanism of the circuit breaker is described referring to FIG. 11 which shows timing charts of the operation.

In FIG. 11, timing chart (a) shows timing of ON and OFF of excitation signal of the above-mentioned conventional electro-magnetic device 36 which is to be used for opening the contacts of the circuit breaker. Timing chart (b) shows the pressure of the oil in the pilot chest 19*c* of the supplemental exhaust valve 19. Timing chart (c) shows the position of the supplemental exhaust valve 19 and the supplemental feed valve 20 which move in one body. Timing chart (d) shows the pressure of the oil in the pilot chest 14*c* of the exhaust valve 14. Timing chart (e) shows the position of the feed valve 13 and the exhaust valve 14 which move in one body. Timing chart (f) shows the pressure of the oil in the second pressure chest 5*b* of the cylinder 5. Timing chart (g) shows the movement of the differential piston 3. Timing chart (h) shows the movement of the latch 63. And timing chart (i) shows the pressure of the oil in the circular groove 73.

In FIG. 10 which shows the closing state of the conventional driving mechanism of the circuit breaker, when the opening signal is inputted to the electromagnetic device 36 at the point of time a1 in the timing chart (a) in FIG. 11, the stationary core 36*b* is excited, and the moving core 36*a* moves for switching the opening valve 28 via the operation rod 34. Thereby, the ball-shaped valve body 30 is opened. As a result, the pilot chest 19*c* of the supplemental exhaust valve 19 of the amplifier valve 8 is connected to the lower-pressure tank 18 via the pipe lines 57 and 58. The high-pressure oil in the pilot chest 19*c* is exhausted to the lower-pressure tank 18 at a point of time b1 in the timing chart (b) in FIG. 11. When the high-pressure oil in the pilot chest 19*c* is exhausted, the valve bodies 19*b* and 20*b* start to move upward in FIG. 10. By such operation, the pipe lines 16 and 22 are connected at a point of time cl in the timing chart (c) in FIG. 11. Therefore, the pilot chest 14*c* of the exhaust valve 14 of the main valve 7 is connected to the lower-pressure tank 18 via the pipe lines 16 and 22, and the high-pressure oil in the pilot chest 14*c* is exhausted at a point of time d1 in the timing chart (d) in FIG. 11. When the high-pressure oil in the pilot chest 14*c* is exhausted, the valve bodies 13*b* and 14*b* move rightward in FIG. 10. Thereby, the exhaust valve 14 of the main valve 7 opens the pipe line 17 which is connected to the lower-pressure tank 18, and closes the feed valve 13 at a point of time e1 in the timing chart (e) of FIG. 11.

Thereby, the high-pressure oil in the second pressure chest 5*b* of the cylinder 5 is exhausted to the lower pressure tank 18 through the valve chest 7*a* and the pipe line 17 at a point of time f1 in the timing chart (f) in FIG. 11. When the pressure of the oil in the second pressure chest 5*b* of the cylinder 5 is reduced, a thrust is generated in downward direction in FIG. 10, and the differential piston 3 starts to move in a direction to open the contact 1 of the circuit breaker at a point of time g1 in the timing chart (g) in FIG. 11. The oil in the circular groove 73 has been exhausted with pushing up the dashpot ring 74. The high pressure oil which is continuously supplied from the accumulator 9 through the restrictor 75 and the pipe line 76 is also exhausted to the lower pressure tank 18 at a point of time i1 in the timing chart (i) in FIG. 11. Even when the opening signal is shutoff at a point of time a3 in the timing chart (a) in FIG. 11 and after that the opening valve 28 is closed, the amplifier valve 8 and the main valve 7 are not returned to the initial positions since the high-pressure oil in the pipe line 77 is exhausted when the amplifier valve 8 and the main valve 7 are once switched.

At this time, a high-pressure oil is supplied to the closing operation control device 61 from the accumulator 9 through the pipe line 59 and the restrictor 54. Thereby, the piston 62 always pushes on the back of the latch 63. When the opening operation of the contact 1 by the differential piston 3 is completed, the pin 50 provided on the differential piston 3 has passed the latch 63 (at a point of time g2 in the timing chart (g) in FIG. 11), and the latch 63 starts to rotate in counterclockwise direction in FIG. 10 around the pivot 64 (at a point of time h1 in the timing chart (h) in FIG. 11). Thereby, the latch 63 engages with the pin 50 (at a point of time h2 in the timing chart (h) in FIG. 11).

In a condition that the opening operation of the contact 1 is completed, a bottom face 74*a* of the dashpot ring 74 contacts a face 5c of the cylinder 5, tightly. As a result, the high-pressure oil from the accumulator 9 is supplied to the circular groove 73 and the pipe lines 76 and 77 through the restrictor 75 (at a point of time 12 in the timing chart (1) in FIG. 11). Furthermore, the high-pressure oil is continuously supplied to the pilot chest 19*c* through the restrictor 72 and the pipe line 71 (at a point of time b2 in the timing chart (b) in FIG. 11). When the pressure of the oil in the pilot chest 19*c* reaches a predetermined value, a back-pressure, which is applied to the supplemental feed valve 20 which is on a closed state overcomes the back-pressure applied to the supplemental exhaust valve 19. Therefore, the supplemental exhaust valve 19 and the supplemental feed valve 20 start to move in one body (at a point of time c2 in the timing chart (c) in FIG. 11). The supplemental exhaust valve 19 of the amplifier valve 8 closes the pipe line 22 communicating to the lower-pressure tank 18 and opens the supplemental feed valve 20. As a result, the high-pressure oil reaches the pilot chest 14*c* of the exhaust valve 14 through the pipe lines 12, 51 and 16. And the high-pressure oil in he pilot chest 14*c* switches the main valve 7, again. When the exhaust valve 14 receives the high-pressure oil in the pilot chest 14*c*, it closes the pipe line 17 communicating to the lower-pressure tank 18 and opens the feed valve 13 at a point of time e2 in the timing chart (e) in FIG. 11.

As a result, the high-pressure oil reaches the second pressure chest 5*b* of the cylinder 5 through the feed valve 13 and the pipe line 11. A thrust in upward direction in FIG. 10 is generated due to the difference between the areas of the larger piston area side and the smaller piston area side of the differential piston 3 which respectively receive the pressure at a point of time f2 in the timing chart (f) in FIG. 11. However, the latch 63 has already been engaged with the pin 50 (at the point of time h2 in the timing chart (h) in FIG. 11), and a back-pressure due to the high-pressure oil which is supplied through the restrictor 54 and the pipe line 59 is applied to the piston 62, so that the thrust in the upward direction is received by the latch 63 and the opened state of the contact of the circuit breaker shown in FIG. 12 is maintained.

Next, the closing operation of the contact 1 is described below. In FIG. 12, when a closing signal is inputted to the closing electro-magnetic device 35 for closing the main contact 1, the moving core 35*a* is driven and the driving force is applied to the closing valve 38 via the operation rod 33, and the ball-shaped valve body 29 is opened. Therefore, the pipe lines 56 and 59 are connected to the lower-pressure tank 18, and the high-pressure oil therein is exhausted to the lower-pressure tank 18. As a result, the force for pushing the latch 63 by the piston 62 is removed. As mentioned above, since the shape of the latch 63 is formed in a manner to release the engagement with the pin automatically by the thrust of the differential piston 3 when the pressure by the piston 62 is removed, the differential piston 3 starts to move upward and finally completes the closing operation of the main contact 1. On the other hand, the high-pressure oil in the accumulator 9 is gradually supplied to the pipe line 59 through the pipe line 52 and the restrictor 54. When the differential piston 3 completes the closing operation, the high-pressure oil is filled in the pipe line 59 for standing the next opening operation of the main contact, as shown in FIG. 10.

The first conventional hydraulic operation apparatus 4 shown in FIG. 9 is configured above, and the second hydraulic operation apparatus 104 is configured substantially the same.

In a circuit breaker with resistor contact, the main contact is opened first and the resistor contact must be opened shortly before the final step of the opening operation of the main contact. As a method for opening the main contact and the resistor contact serially, it is general to input the opening signal to the opening electromagnetic device 36 of the first hydraulic operation apparatus 4 for opening the main contact, at first. After counting a predetermined time period by using a time rug relay and the like, an excitation signal corresponding to the opening signal is inputted to the opening electromagnetic device 36 of the second hydraulic operation apparatus 104 for opening the resistor contact.

When the time periods which are necessary for driving the opening electro-magnetic devices of respective hydraulic operation apparatuses are different, the resister contacts are also closed at different timings in opening operation of the circuit breaker. Thereby, the over voltage during the opening operation can not be restrained sufficiently. Furthermore, when the time period during the while the resistor contact is kept connected becomes longer, a severe heat duty is demanded to the resisters. Let us suppose such an accident occurs that the opening signal can not input to the hydraulic operation apparatuses owing to the disconnection of the control circuit which is to output an excitation signal to the electro-magnetic devices corresponding to the opening command to the hydraulic operation apparatuses. In such a case, only the main contact or the resistor contact is opened and the other is not opened. Therefore, the main contact and the resistor contacts can not be opened serially.

PURPOSE AND SUMMARY OF THE INVENTION

Purpose of the present invention is to solve the above-mentioned problems of the conventional hydraulic operation apparatus of the circuit breaker and to provide an improved circuit breaker and an operation apparatus of the circuit breaker.

A driving mechanism of a circuit breaker in accordance with the present invention comprises:

(A) first and second hydraulic operation apparatuses for, respectively, driving a main contact and a resistor contact of the circuit breaker and having:

an accumulator supplying a predetermined high-pressure oil;

a driving device having a differential piston for driving the main contact or the resistor contact, a first pressure chest provided on the smaller piston area side of the differential piston whereto the high-pressure oil is always supplied and a second pressure chest provided on the larger piston area side of the differential piston;

a main valve for controlling the pressure in the second pressure chest of the driving device; and a pressure discharge part disposed between the cylinder and the dashpot ring, whereto the high-pressure oil is always supplied from the accumulator; and (B) a sequential control valve provided between the first and second hydraulic operation apparatuses, for detecting the difference between the pressure of the oil in the pressure discharging part and that in the second pressure chest of the driving device in the first hydraulic operation apparatus after discharging the pressure in the second pressure chest of the driving device in the first hydraulic operation apparatus for moving the differential piston in a direction to open the main contact, and opening an oil-pressure port when the pressure in the second pressure chest becomes smaller than that in the pressure discharging part, thereby in the second hydraulic operation apparatus, making a pressure in the second pressure chest on the larger piston area side of the differential piston discharge for moving the differential piston in a direction to open the resistor contact.

In the driving mechanism of circuit breaker in accordance with the present invention, in the first hydraulic operation apparatus, when the pressure in the second pressure chest of the differential piston is discharged by the main valve, the pressure in the first pressure chest overcomes the pressure in the second pressure chest, and thereby the differential piston moves to open the main contact of the circuit breaker. In a condition that the opening operation of the contact 1 is completed, the pressure In the pressure discharging part differs from that in the second pressure chest. When the sequential control valve detects the pressure difference, it operates to discharge the pressure in the second pressure chest of the differential piston in the second hydraulic operation apparatus. When the pressure in the second pressure chest of the differential piston in the second hydraulic operation apparatus is discharged, the differential piston moves to open the resistor contact of the circuit breaker. As a result, the main contact and the resistor contact of tile circuit breaker are serially opened.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

First Embodiment

Figure 1:
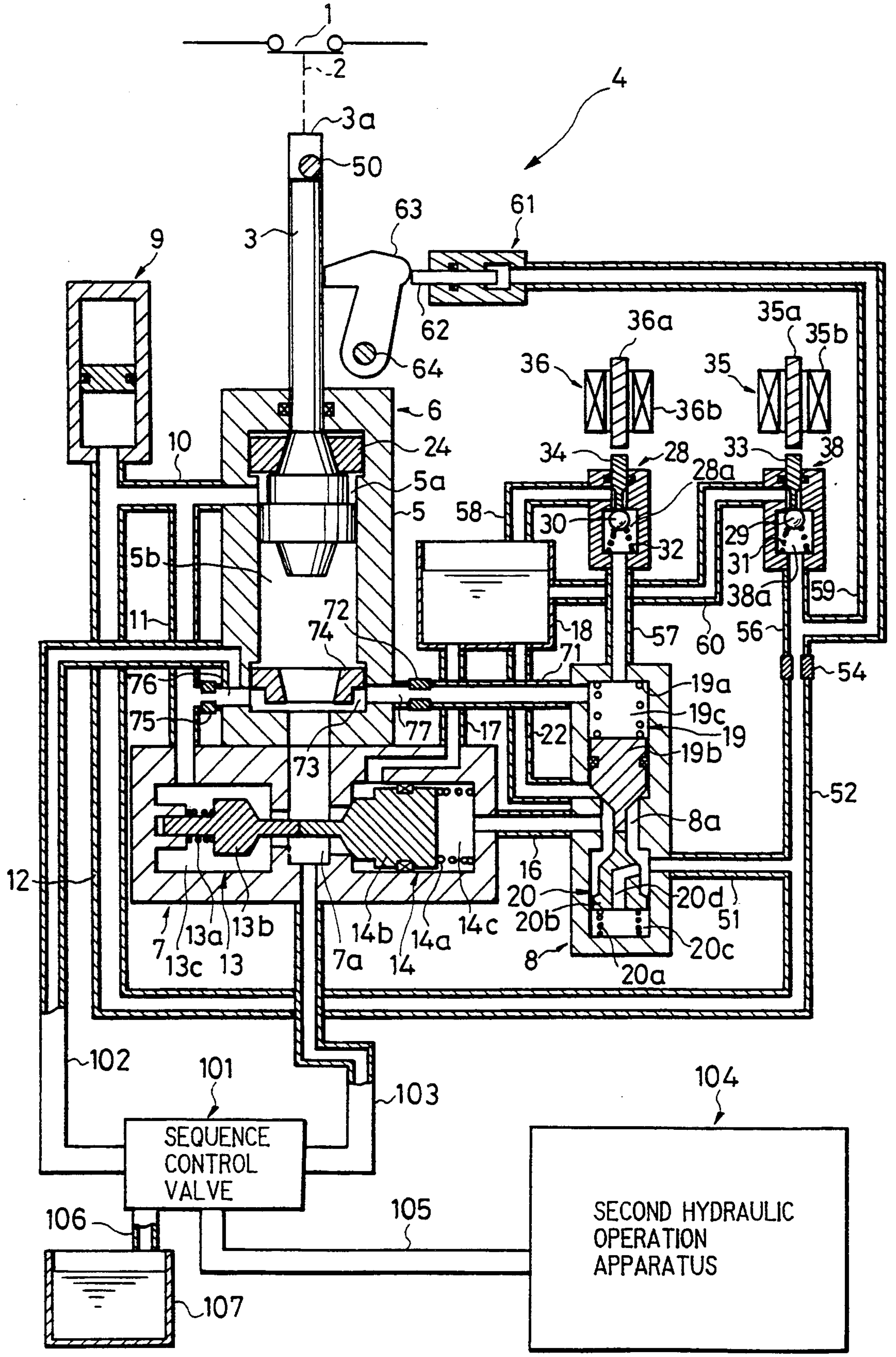
FIG. 1 is a sectional side view showing a constitution of a first preferred embodiment of a hydraulic operation apparatus of a circuit breaker in accordance with the present invention.

A first preferred embodiment of a driving mechanism of a circuit breaker in accordance with the present invention is described referring to FIGS. 1, 2, 3 and 6. FIG. 1 is a sectional side view showing a constitution of the first preferred embodiment of the driving mechanism of the circuit breaker when a main contact of the circuit breaker is closed.

Configuration

Figure 9:
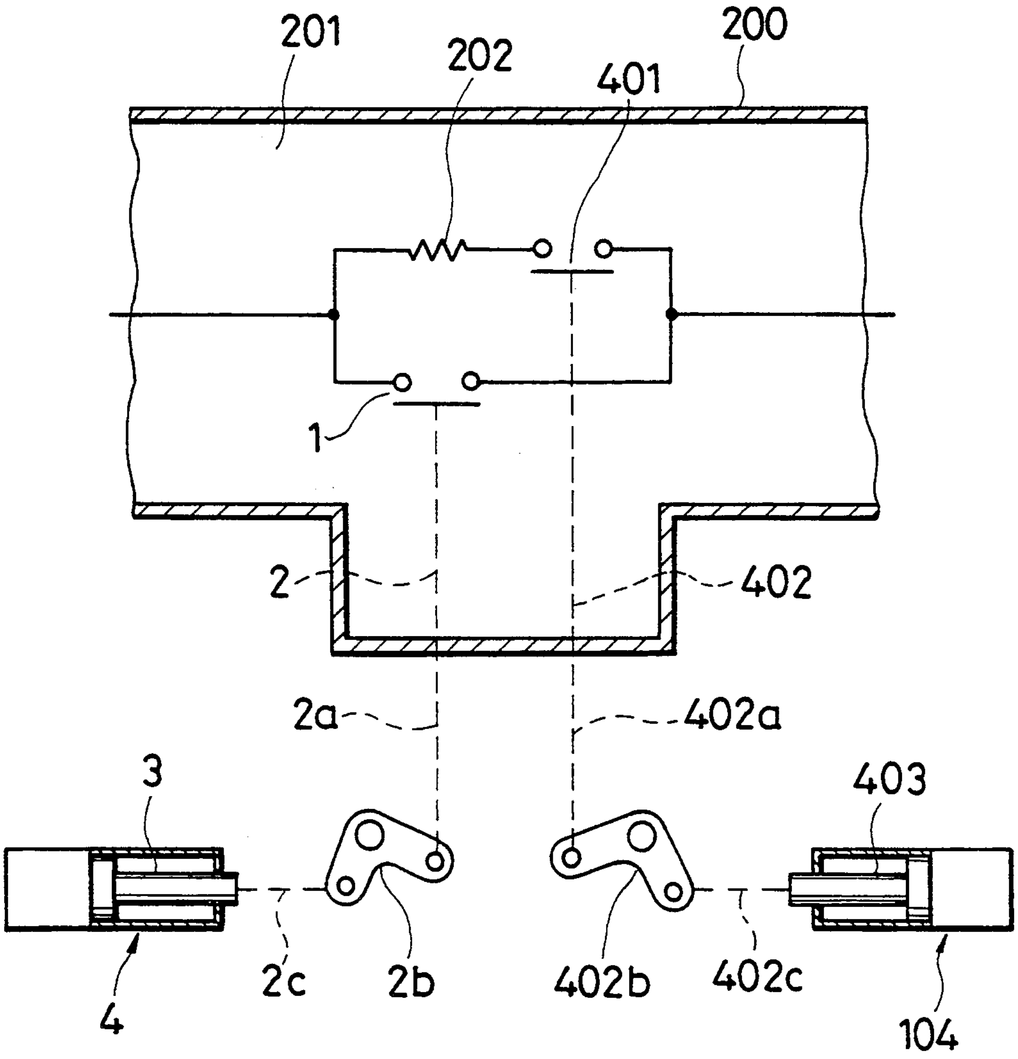
FIG. 9 (Prior Art)
FIG. 9 is the sectional side view schematically showing the constitution of the conventional circuit breaker.
Figure 10:
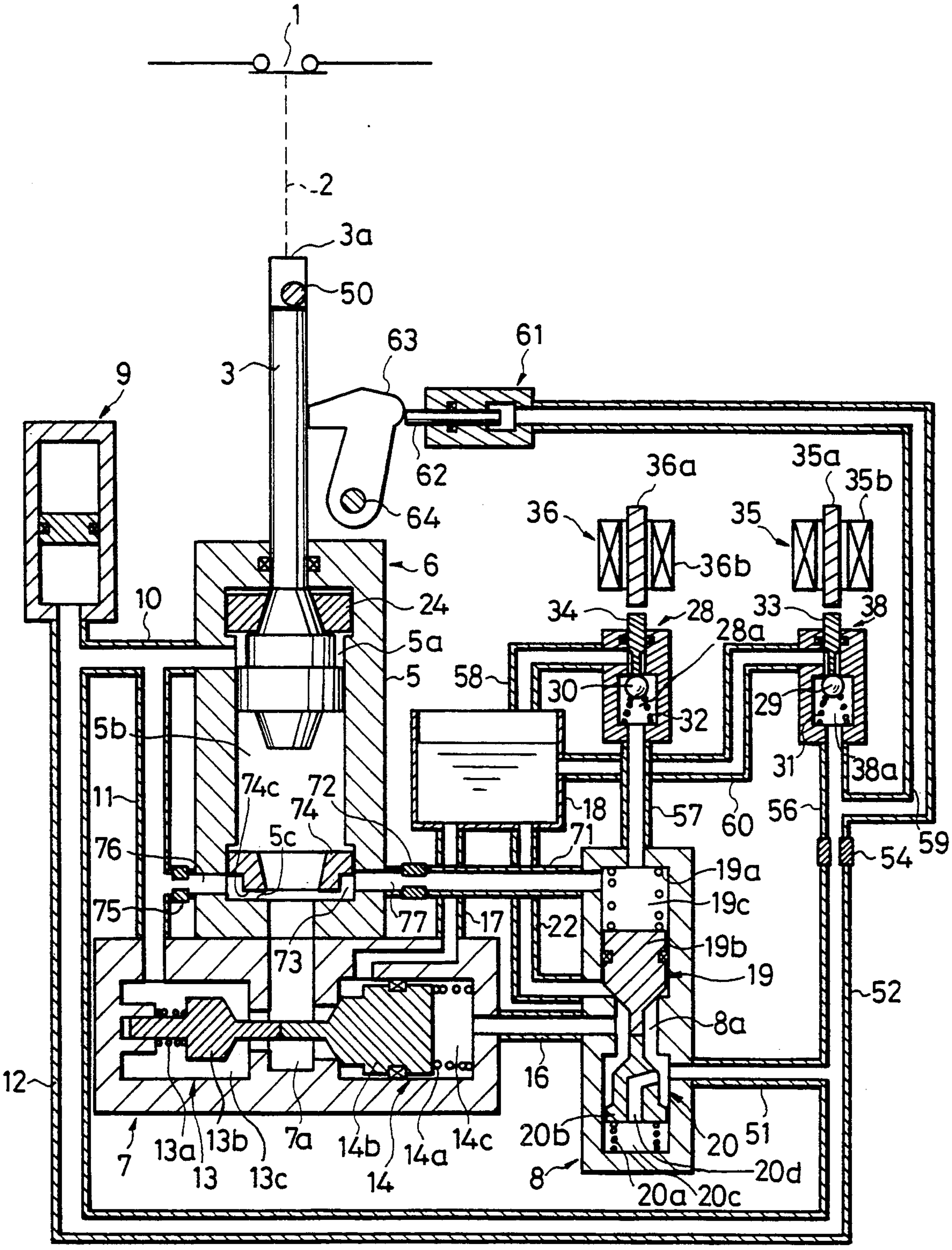
FIG. 10 (Prior Art)
FIG. 10 is the sectional side view showing the constitution of the conventional hydraulic operation apparatus of the circuit breaker when the circuit breaker Is closed.
Figure 11A:
FIG. 11(a) (Prior Art)
FIG. 11 is the drawing for showing the time charts during the opening operation of the conventional hydraulic operation apparatus.
Figure 11B:
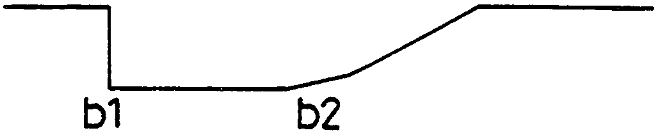
FIG. 11(b) (Prior Art)
Figure 11C:
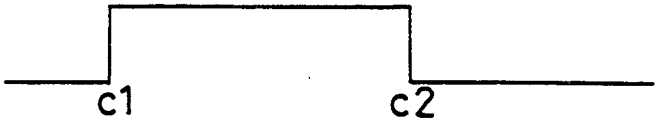
FIG. 11(c) (Prior Art)
Figure 11D:
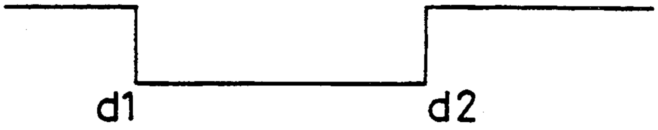
FIG. 11(d) (Prior Art)
Figure 11E:
FIG. 11(e) (Prior Art)
Figure 11F:
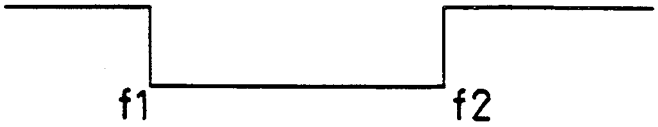
FIG. 11(f) (Prior Art)
Figure 11G:
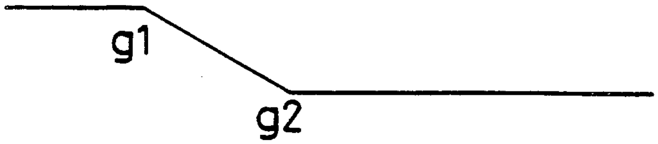
FIG. 11(g) (Prior Art)
Figure 11H:
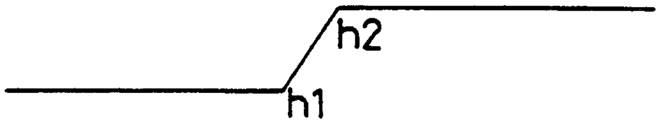
FIG. 11(h) (Prior Art)
Figure 11I:
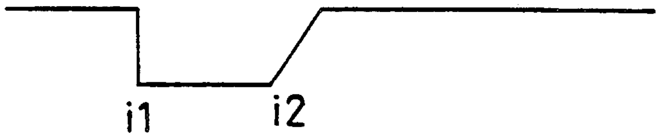
FIG. 11(i) (Prior Art)
Figure 12:
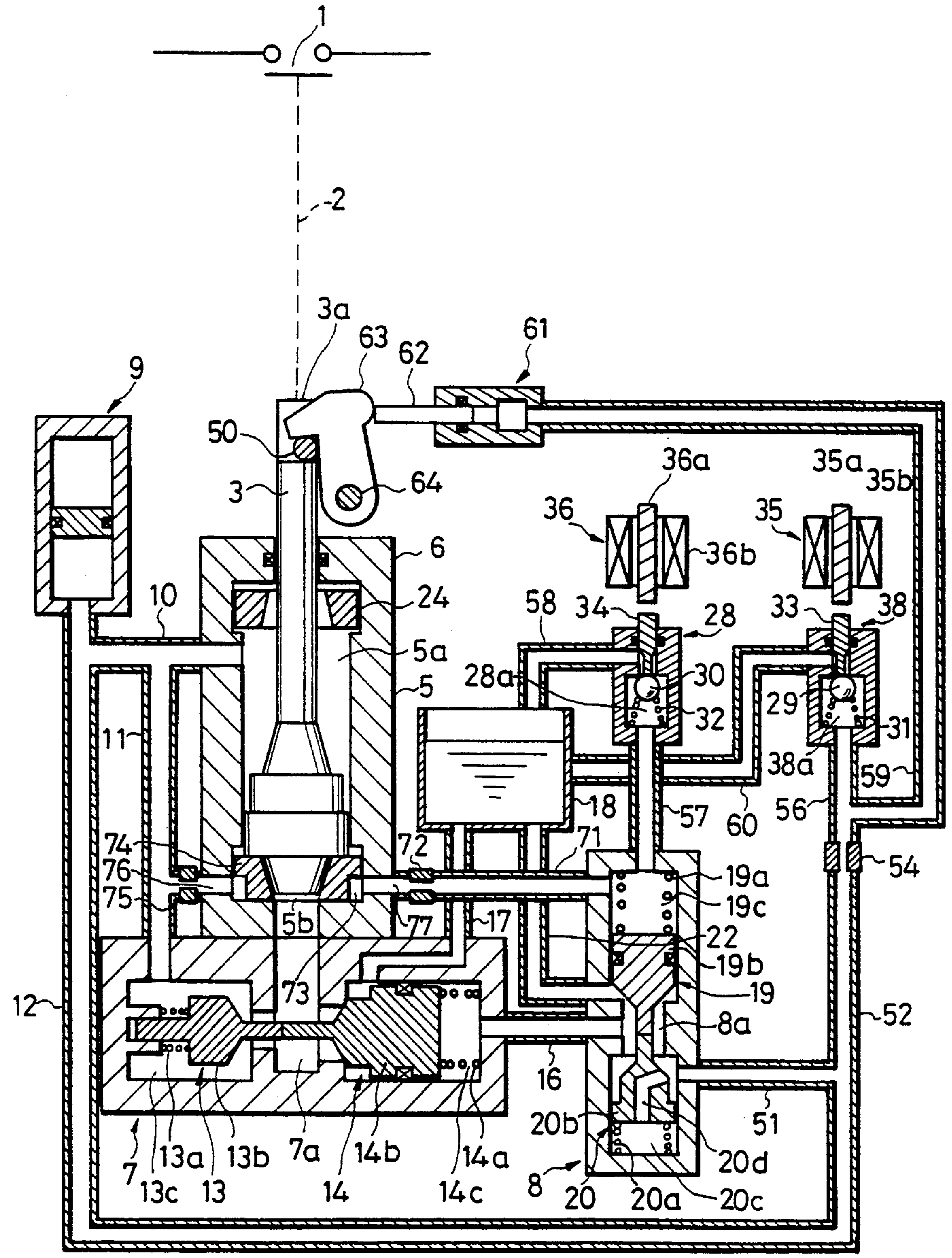
FIG. 12 (Prior Art)
FIG. 12 is the sectional view showing the constitution of the conventional hydraulic operation apparatus when the circuit breaker is opened.

In FIG. 1, the driving mechanism of the circuit breaker in accordance with the present invention comprises a first hydraulic operation apparatus 4, a second hydraulic operation apparatus 104 and a sequence control valve 101 which is connected between the first and second hydraulic operation apparatuses 4 and 104. The first hydraulic operation apparatus 4 is to be used for driving the main contact of the circuit breaker, and the second hydraulic operation apparatus 104 is to be used for driving a resistor contact of the circuit breaker, similarly to the conventional driving mechanism of the circuit breaker shown in FIG. 9. Since the second hydraulic operation apparatus 104 has substantially the same constitution as the first hydraulic operation apparatus 4, the second hydraulic operation apparatus 104 is schematically shown in FIG. 1. The description of the first embodiment is made mainly referring to the first hydraulic operation apparatus 4.

In FIG. 1, a driving device 6 for driving the main contact 1 comprises a differential piston 3, a cylinder 5 and dashpot rings 24 and 74. An end 3$a$ of the differential piston 3 is connected to the main contact 1 of the circuit breaker via a link mechanism 2. A first pressure chest 5$a$ of the cylinder 5, which is positioned in a smaller piston area side of the differential piston 3 is connected to an accumulator 9 through a pipe line 10. A second pressure chest 5$b$ of the cylinder 5 is positioned at a larger piston area side of the differential piston 3.

A main valve 7, which is used for controlling the driving device 6, is provided neighboring to the driving device 6. The main valve 7 consists of a main valve chest 7$a$, a feed valve 13 and an exhaust valve 14. The feed valve 13 comprises a compression spring 13$a$, a valve body **13*b* and a pilot chest 13*c*. The exhaust valve 14 also comprises a compression spring 14*a*, a valve body 14*b* and a pilot chest 14*c*. The pilot chest 13*c* is connected to the accumulator 9 through the pipe line 11. The main valve chest 7*a* is connected to the second pressure chest 5*b* of the cylinder 5 of the driving device 6. The valve bodies 13*b* and 14*b*** are positioned to face to each other and coupled to move in one body.

An amplifier valve 8 comprises an amplifier valve chest **8*a*, a supplemental exhaust valve 19 and a supplemental feed valve 20. The supplemental exhaust valve 19 comprises a compression spring 19*a*, a valve body 19*b* and a pilot chest 19*c*. The supplemental feed valve 20 also comprises a compression spring 20*a*, a valve body 20*b* and a pilot chest 20*c*. The valve bodies 19*b* and 20*b* are positioned back to back to each other and coupled to move in one body. The pilot chest 14*c* of the exhaust valve 14 of the main valve 7 and the amplifier valve chest 8*a* of the amplifier valve 8 are connected by a pipe line 16. As shown in FIG. 1, a pipe line 20*d* is provided on the valve body 20*b*, and thereby, the amplifier valve chest 8*a* and the pilot chest 20*c* is connected. Furthermore, pipe lines 12 and 51 are provided for connecting to the accumulator 9 and the amplifier valve chest 8*a* of the amplifier valve 8. The second pressure chest 5*b* of the cylinder 5 of the driving device 6 and the pilot chest 19*c* of the supplemental exhaust valve 19 is connected by pipe lines 71 and 77 and a restrictor 72. The second pressure chest 5*b* of the cylinder 5 is connected to the accumulator 9 through pipe lines 76, 11 and 10 and a restrictor 75**.

A closing valve 38, which is to be used in closing operation of the circuit breaker, is configured in a manner to be connected to a valve chest **38*a* and the accumulator 9 by pipe lines 12, 52 and 56 and a restrictor 54. Thereby, the high-pressure oil is supplied from the accumulator 9 to the closing valve 38. An opening valve 28, which is to be used in opening operation of the circuit breaker, is configured in a manner to be connected to a valve chest 28*a* and the pilot chest 19*c* of the supplemental exhaust valve 19 by a pipe line 57. The valve chest 28*a* of the opening valve 28 is connected to a lower-pressure tank 18 through a pipe line 58. Furthermore, the lower-pressure tank 18 is connected to the exhaust valve 14 of the main valve 7 through a pipe line 17. The supplemental exhaust valve 19 is also connected to the lower-pressure tank 18 through a pipe line 22. The valve chest 38*a* of the closing valve 38 is also connected to the lower pressure tank 18 through a pipe line 60**.

The closing valve 38 comprises a ball-shaped valve body 29 and a compression spring 31. The opening valve 28 also comprises a ball-shaped valve 30 and a compression spring 32. The closing valve 38 is controlled by an electro-magnetic device 35 via an operation rod 33. The opening valve 28 is also controlled by another electro-magnetic device 36 via another operation rod 34. Each electro-magnetic device 35 or 36 comprises a moving core **35*a* or 36*a* and a stationary coil 35*b* or 36*b*, wherein the moving core 35*a* or 36*a* moves linearly by responding to magnetic force generated by the stationary coil 35*b* or 36*b***.

A pipe line 59 is branched from the pipe line 56. The pipe line 59 is connected to a closing operation control device 61. The closing operation control device 61 comprises a smaller piston 62 which is driven by the high-pressure oil supplied to the closing operation controlling device 61. A latch 63 is provided in the vicinity of the closing operation control device 61. The latch 63 is rotatably borne by a pivot 64 which is, for example, fixed on the cylinder 5. When the high-pressure oil is supplied to the closing operation control device 61, the piston 62 is driven to move leftward in FIG. 1, and the piston 62 pushes the back face of the latch 63. When the latch 63 has been pushed by the piston 62, the latch 63 can rotate. When the latch 63 is engaged with a pin 50 which is provided on the differential piston 3, the engagement is maintained. The latch 63 has a specific shape in a manner that the latch 63 is automatically rotated in clockwise direction in FIG. 1 for releasing the engagement with the pin 50 by receiving a force from the differential piston 3. When the pushing force of the piston 62 is removed, the latch 63 starts to rotate by the force from the differential piston 3.

The dashpot ring 74 is allowed to slightly move upward and downward along an inner surface of the cylinder 5. A circular groove 73 is provided on an outer periphery of the dashpot ring 74 for connecting to the pipe lines 76 and 77. When the dashpot ring 74 is pushed down by the differential piston 3, and oil-tightly seals from the second pressure chest **5*b* of the cylinder 5, the high-pressure oil flows from the pipe line 76 to the pipe line 77 through the circular groove 73. On the other hand, when the dashpot ring 74 is not pushed down by the differential piston 3, and the pressure of the oil in the pipe lines 76 and 77 is larger than the pressure in the second pressure chest 5*b* of the cylinder 5, the dashpot ring 74 floats. Thereby, the second pressure chest 5*b* of the cylinder 5 and the pipe lines 76 and 77** are connected.

As shown in FIG. 1, a sequence control valve 101 is provided between the first hydraulic operation apparatus 4 and the second hydraulic operation apparatus 104. A pipe line 102 is provided for transmitting the oil pressure in the circular groove 73 of the dashpot ring 74 to the sequential control valve 101. A pipe line 103 is also provided for transmitting the oil pressure in a main valve chest **7*a* of the main valve 7 to the sequence control valve 101. The sequential control valve 101 and the second hydraulic operation apparatus 104 are connected by a pipe line 105. Furthermore, the sequential control valve 101 and a lower-pressure tank 107 are connected by a pipe line 106**.

In the accumulator 9, the pressure of the oil is maintained at a predetermined value by an oil pump unit which is not shown in the figure. In FIG. 1, the high-pressure oil is supplied from the accumulator 9 to tile pressure chests **5*a* and 5*b*, to the pilot chests 13*c* 14*c*, 19*c* and 20*c* and the valve chests 28*a* and 38*a* through the pipe lines 10, 11, 12, 16, 51, 52, 56, 57, 71, 76 and 77**.

At this time, tile pressure of the oil in the pressure chests **5*a* and 5*b* are the same and the pressure receiving area of the differential piston 3 in the second pressure chest 5*b* is larger than that of the first pressure chest 5*a*. Therefore, the differential piston 3 moves upward in FIG. 1 and maintains the position. Similarly, the valve bodies 13*b* and 14*b* move leftward in FIG. 1 owing to the difference between the pressure receiving areas of the valve bodies 13 and 14. The valve bodies 19*b* and 20*b* have been moved downward in FIG. 1**.

Figure 2:
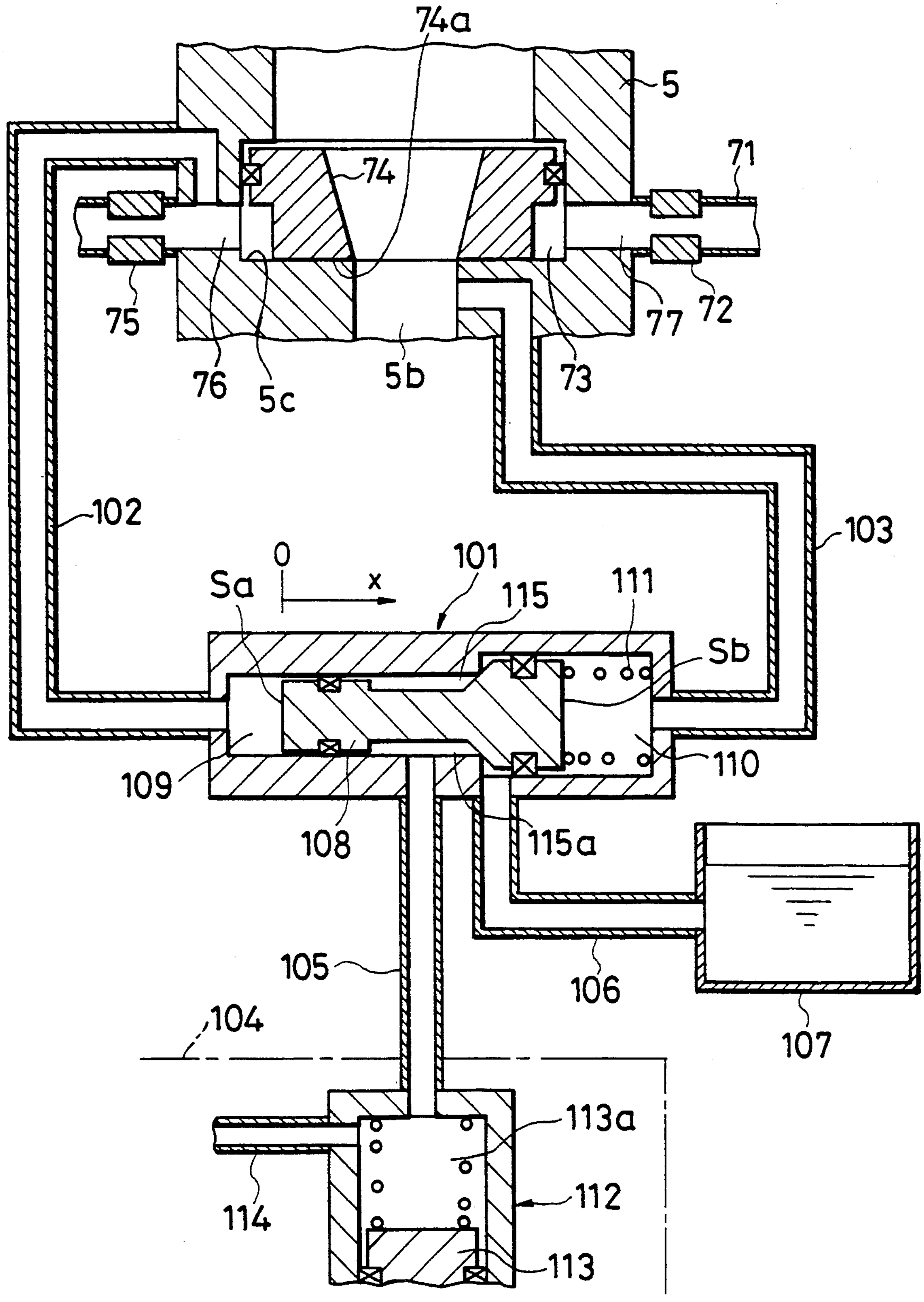
FIG. 2 is a sectional side view showing a detailed constitution of a sequential control valve shown in FIG. 1 when the circuit breaker is closed.
Figure 3:
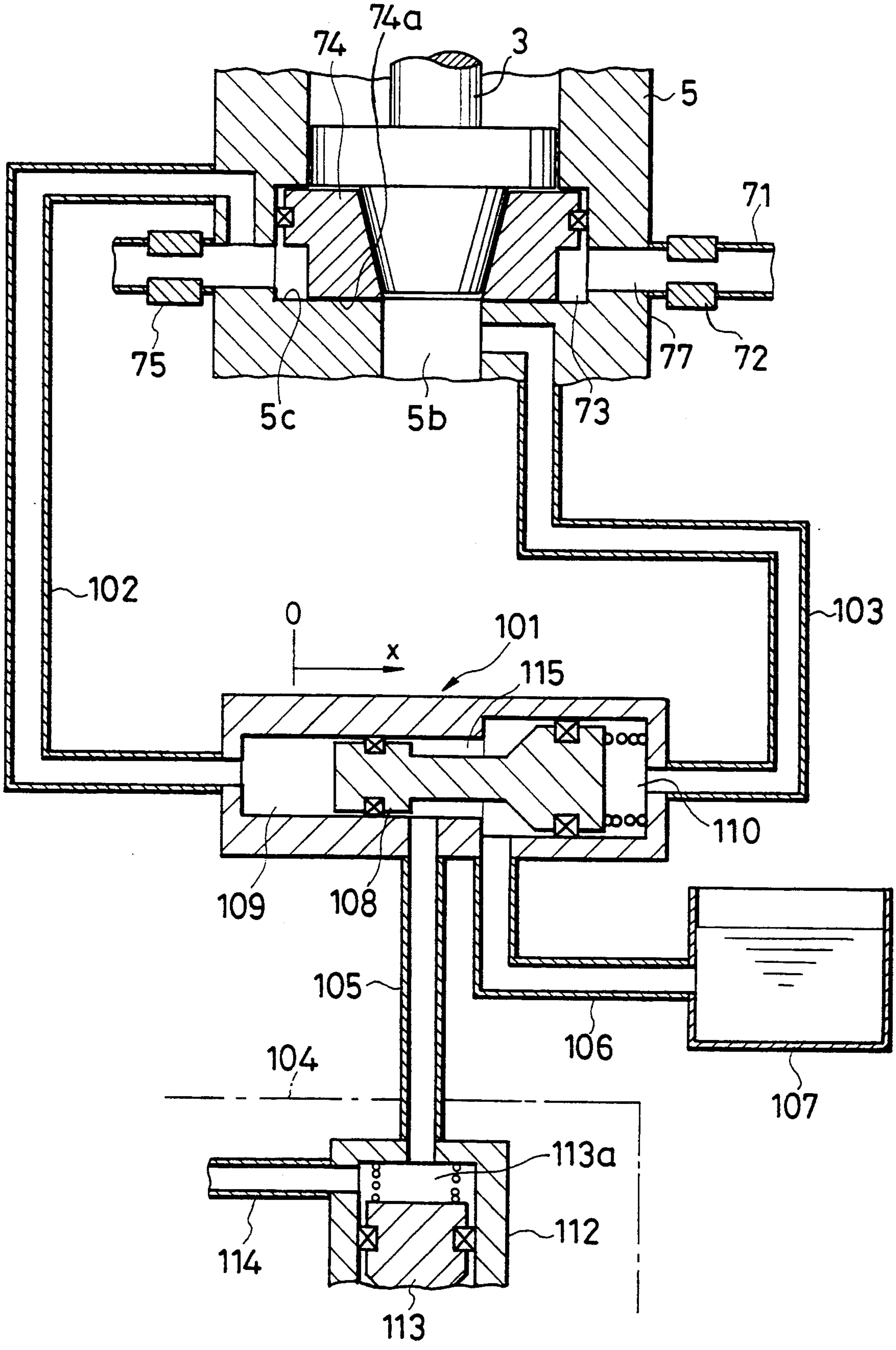
FIG. 3 is a sectional side view showing a detailed constitution of the sequential control valve during the opening operation of the circuit breaker.

A detailed constitution of the sequential control valve 101 is described referring to FIGS. 2 and 3. FIG. 2 shows the constitution of the sequence control valve 101 in the closed state of the circuit breaker, and FIG. 3 shows that during the opening operation of the circuit breaker.

In FIGS. 2 and 3, a switching valve body 108 is provided in the sequential control valve 101. The pipe line 102 is connected to a pressure chest 109 of the sequential control valve 101, which receives the pressure of the circular groove 73, and the pipe line 103 is connected to a pressure chest 110 of the sequential control valve 101, which receives the pressure of the second pressure chest 5b of the cylinder 5. With respect to the pressure receiving area of the switching valve body 108, the area of the pressure chest 109 is designated by "Sa", and the area of the pressure chest 110 is designated by "Sb" in the figure. Hereupon, the area "Sb" is selected to be larger than the area "Sa" A compression spring 111 is provided between the switching valve body 108 and an inner wall of the sequential control valve 101 in a manner to press the switching valve body 108 in a direction to close the oil-pressure port 115a (lefthand in FIG. 2). An end of the pipe line 105 is connected to a switching valve chest 115, and the other is connected to a pilot chest 113a of a supplemental exhaust valve 113 of an amplifier valve 112 in the second hydraulic operation apparatus 104. The amplifier valve 112 is driven in opening operation of the resistor contact of the circuit breaker, which is substantially the same as the amplifier valve 8 in the first hydraulic operation apparatus 4. At this time, an opening electro-magnetic device and an opening valve, which are substantially the same as those 36 and 28 in the first hydraulic operation apparatus 4, are removed from the second hydraulic operation apparatus 104. When the switching valve body 108 moves rightward as shown in FIG. 3, the pilot chest 113a of the supplemental exhaust valve 113 is connected to the lower-pressure tank 107 through the pipe line 105, switching valve chest and the pipe line 106. An end of a pipe line 114 is connected to the pilot chest 113a of the supplemental exhaust valve 113. The other end of the pipe line 114 is connected to another pipe through a valve which are not shown in the figure, and thereby the pressure of the oil in the pipe line 114 is kept in a high pressure. The second hydraulic operation apparatus 104 has substantially the same constitution as that of the first hydraulic operation apparatus 4 except that the sequential control valve 101 is connected instead of the provision of the opening electro-magnetic device and the opening valve, as mentioned above.

Operation

Figures 6A, 6B, 6C, 6D, 6E, 6F, 6G, 6H, 6I, 6J, 6K, 6L:
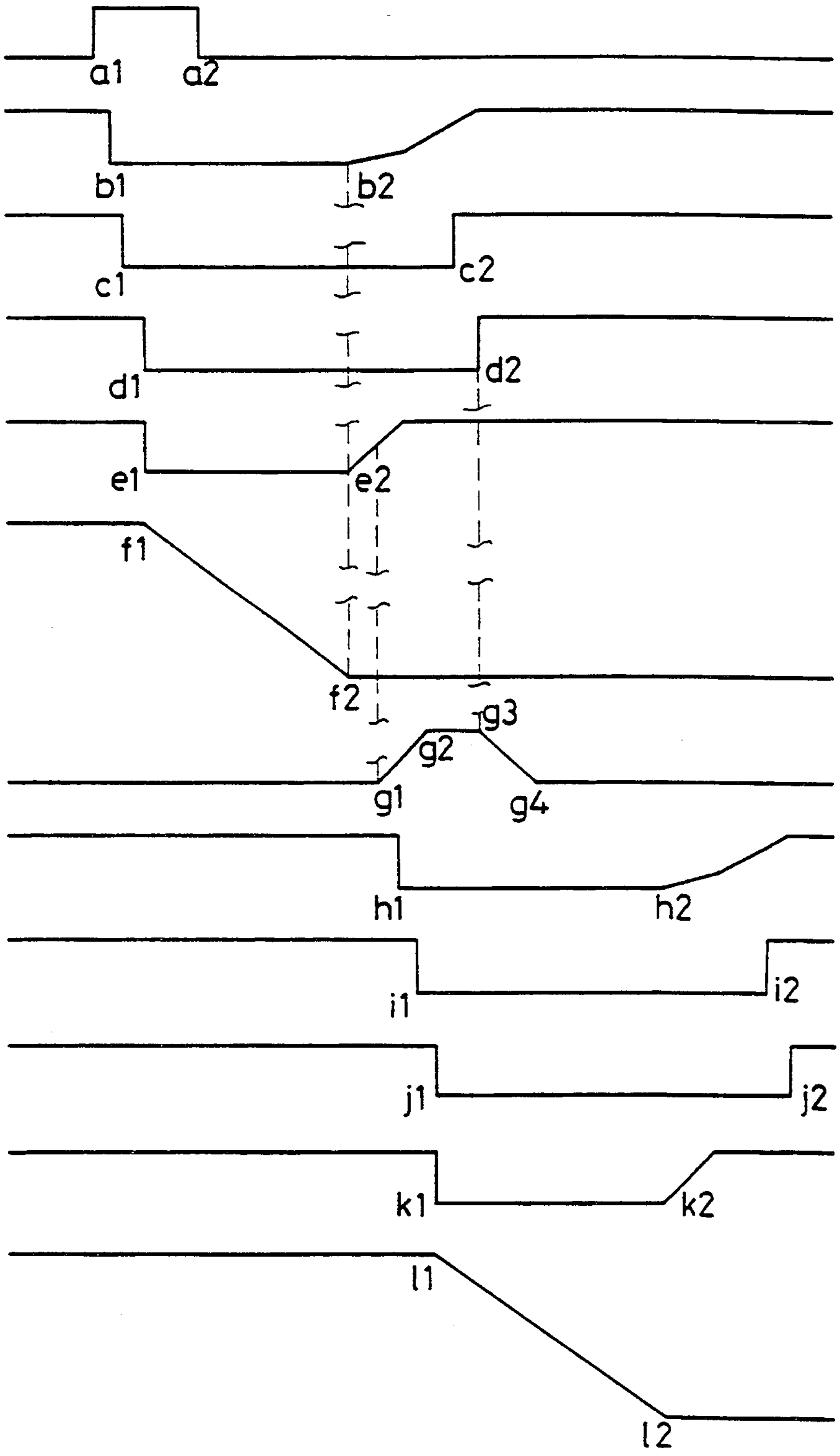
FIG. 6 is a drawing for showing time charts during the opening operation of the hydraulic operation apparatus in accordance with the present invention.

The opening operation of the above-mentioned driving mechanism of the circuit breaker is described referring to FIG. 6 which shows timing charts of the operation.

In FIG. 6, timing charts (a), (b), (c), (d), (e) and (f) relate to the operation of the first hydraulic operation apparatus 4. The timing chart (a) shows timing of ON and OFF of excitation signal of the electro-magnetic device 36 which is to be used for opening the contacts of the circuit breaker. The timing chart (b) shows the pressure of the oil in the pilot chest 19c of the supplemental exhaust valve 19. The timing chart (c) shows the pressure of the oil in the pilot chest 14c of the exhaust valve 14. The timing chart (d) shows the pressure of the oil in the second pressure chest 5b of the cylinder 5. The timing chart (e) shows the pressure of the oil in the circular groove 73. The timing chart (f) shows the movement of the differential piston 3. Timing chart (g) shows the position of the switching valve body 108. Timing charts (h), (i), (j), (k) and (l) relates to the operation of the second hydraulic operation apparatus 104. The timing chart (h) shows the pressure of the oil in the pilot chest 113a of the supplemental exhaust valve 113. The timing chart (i) shows the pressure of the oil in a pilot chest of an exhaust valve, which are not shown in the figure but substantially the same as the pilot chest 14c of the exhaust valve 14 in the first hydraulic operation apparatus 4. The timing chart (J) shows the pressure of the oil in a pressure chest of larger piston area side of a differential piston, which is not shown in the figure but substantially the same as the second pressure chest 5b of the cylinder 5 in the first hydraulic operation apparatus 4. The timing chart (k) shows the pressure of the oil in a circular groove of a dashpot ring, which is not shown in the figure but substantially the same as the circular groove 73 In the first hydraulic operation apparatus 4. The timing chart (1) shows the motion of the differential piston, which is not shown in the figure but substantially the same as the differential piston 3 in the first hydraulic operation apparatus 4.

In FIG. 2 which shows the closing state of the circuit breaker, when an opening command is inputted to the electro-magnetic device 36 in the first hydraulic operation apparatus 4 at a point of time a1 in the timing chart (a) in FIG. 6, the stationary coil 36b is excited, and the moving core 36a is driven for applying the driving force to the opening valve 28 via the operation rod 34. Thereby, the ball-shaped valve body 30 is opened. As a result, the pilot chest 19c of the supplemental exhaust valve 19 of the amplifier valve 8 is connected to the lower-pressure tank 18 via the pipe lines 57 and 58. The high-pressure oil in the pilot chest 19c is exhausted to the lower-pressure tank 18 at a point of time b1 in the timing chart (b). When the high-pressure oil in the pilot chest 19c is exhausted, the valve bodies 19b and 20b start to move upward in FIG. 1, and the pipe lines 16 and 22 communicate to each other. After that, the high-pressure oil in the pilot chest 14c of the exhaust valve 14 of the main valve 7 is exhausted through the pipe lines 16 and 22 at a point of time cl in the timing chart (c). When the high-pressure oil in the pilot chest 14c is exhausted, the valve bodies 13b and 14b starts to move rightward in FIG. 1, and the pipe line 17, the valve chest 7a and the second pressure chest 5b of the cylinder 5 are connected to each other. As a result, the high-pressure oil in the second pressure chest 5b of the cylinder 5 is exhausted at a point of time d1 in the timing chart (d). At this time, the high-pressure oil in the pipe lines 76 and 77 is also exhausted pushing up the dashpot ring 74. Furthermore, the high pressure oil which is continuously supplied from the accumulator 9 through the restrictor 75 is also exhausted through the valve chest 7a and the pipe line 17 at a point of time e1 in the timing chart (e). When the high-pressure oil in the second pressure chest 5b of the cylinder 5 is exhausted, the differential piston 3 starts to move downward in FIG. 1 which is a direction to open the contact of the circuit breaker at a point of time f1 in tile timing chart (f).

When the pressure of the oil in the second pressure chest 5b of the cylinder 5 is as the same high as that in the pipe lines 76 and 77, the switching valve body 108, which is driven by the difference of the pressure between them, receives a force leftward in FIG. 2. Thereupon, the force applied from the pressure chest 110 is larger than that from the pressure chest 109, since the pressure receiving area of the pressure chest 110 is larger than that of the pressure chest 109. Therefore, tile oil-pressure port 115a is closed. Furthermore, even when the pressure of the oil in both pressure chests 109 and 110 is reduced, the oil pressure port 115a is maintained in closed state, since the switching valve 108 is pressed leftward by the compression spring 111.

In FIG. 3 which shows a state that the opening operation of the differential piston 3 has been completed, a face 74*a* of the dashpot ring 74 and a face 5c of the cylinder 5 are tightly contacted, and thereby, the exhaustion of the high-pressure oil from the pipe lines 76 and 77 is stopped at a point of time f2 in the timing chart (f) in FIG. 6. After that, the pressure of the oil in the pipe lines 76 and 77 starts to rise from a point of time e2 in the timing chart (e) by the supply of the high-pressure oil through the restrictor 75. When the pressure of the oil in the pipe line 76 rises, the pressure of the oil in the pressure chest 109 of the sequential control valve 101 also rises, and a pressure difference is generated between the pressure of the oil in the pressure chest 109 and that in the pressure chest 110. When the pressure difference overcomes the force of the compression spring 111, the switching valve 108 starts to move rightward in FIG. 3 at a point of time g1 in the timing chart (g) in FIG. 6. As a result, the high-pressure oil in the switching valve chest 115 is exhausted to the lower-pressure tank 107.

At this time, oil in the pilot chest 113*a* in the second hydraulic operation apparatus 104 is exhausted at a point of time h1 in the timing chart (f) in FIG. 6. After that, high-pressure oil in another pilot chest in the second hydraulic operation apparatus 104, which is substantially the same as the pilot chest 14*c* of the exhaust valve 14 in the first hydraulic operation apparatus 4, is exhausted at a point of time i1 in the timing chart (1) in FIG. 6. As a result, high-pressure oil in a pressure chest in the second hydraulic operation apparatus 104, which is not shown in the figure but substantially the same as the second pressure chest 5*b* of the cylinder 5, is exhausted at a point of time j1 in the timing chart (J) in FIG. 6. At this time, high-pressure oil in pipe lines in the second hydraulic operation apparatus 104, which is not shown in the figure but substantially the same as the pipe lines 76 and 77 in the first hydraulic operation apparatus 4, is exhausted pushing up a dashpot ring, which is not shown in the figure but substantially the same as the dashpot ring 74. Furthermore, high-pressure oil supplied through a restrictor in the second hydraulic operation apparatus 104, which is not shown in the figure but substantially the same as the restrictor 75 in the first hydraulic operation apparatus 4, is also exhausted at a point of time k1 in the time chart (k), which is substantially the same as point of time j1. The differential piston in the second hydraulic operation apparatus 104 starts to move in a direction to open the resistor contact of the circuit breaker at a point of time 11 in the timing chart (1) in FIG. 6. Thereby, the opening operation of the second hydraulic operation apparatus 104 is executed.

On the other hand, when the pressure of the oil in the pipe lines 76 and 77 in the first hydraulic operation apparatus 4 rises at a point of time e2 in the timing chart (e) in FIG. 6, the supplemental exhaust valve 19 of the amplifier valve 8 and the exhaust valve 14 of tile main valve 7 are serially closed, and the pressure of the oil in the second pressure chest 5*b* returns to high level at a point of time d2 in the timing chart (d) in FIG. 6. Thereby, the pressure of the oil in both side chests 109, 110 of the switching valve body 108 becomes the same. The switching valve body 108 starts to move leftward in FIG. 8 at a point of time g3 of the timing chart (g) in FIG. 6, and the oil-pressure port 115*a* is closed at a point of time g4 in the timing chart (g) in FIG. 6.

Second Embodiment

Configuration

Figure 4:
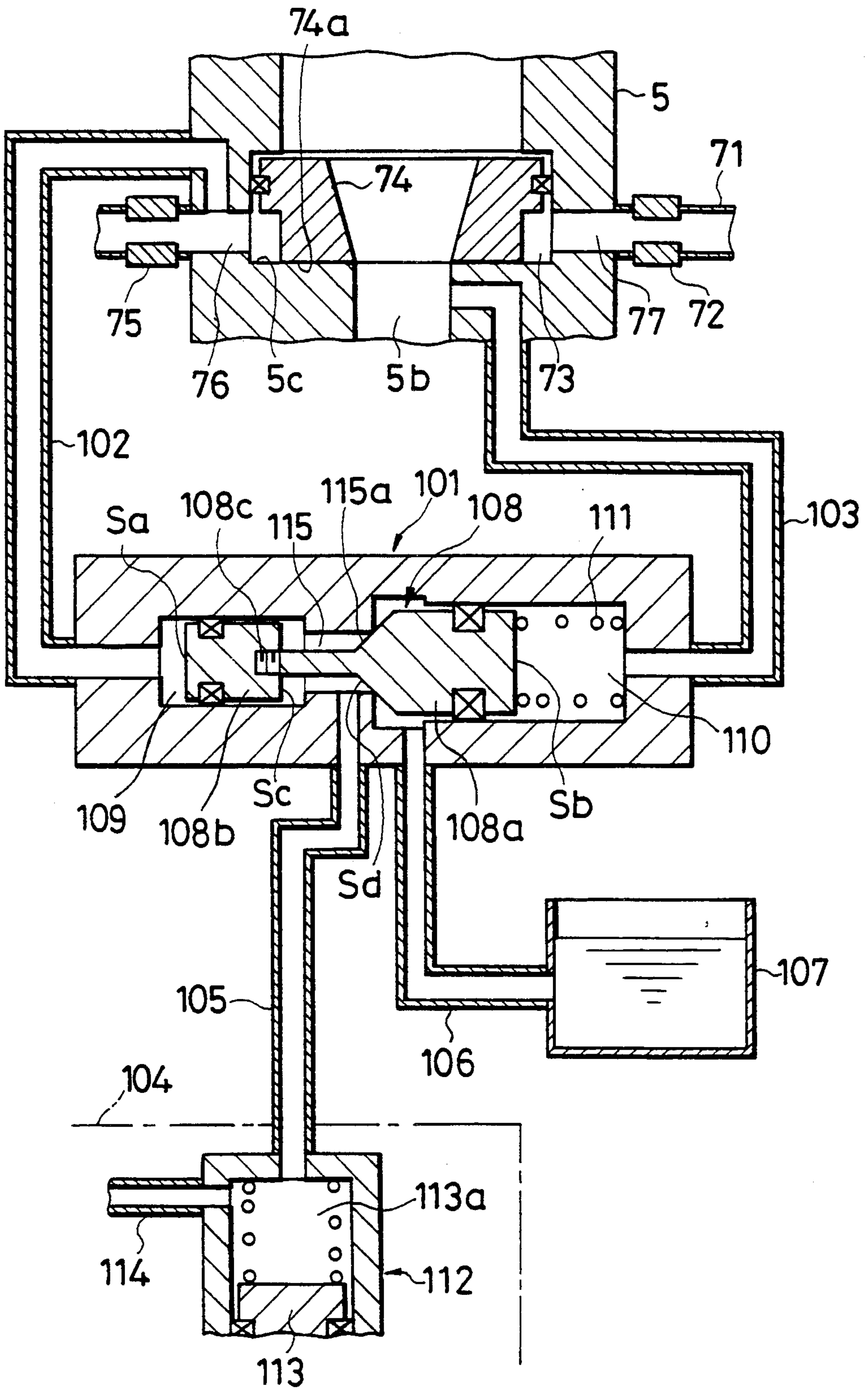
FIG. 4 is a sectional side view showing a detailed constitution of the sequence control valve of a second preferred embodiment when the circuit breaker is closed.
Figure 5:
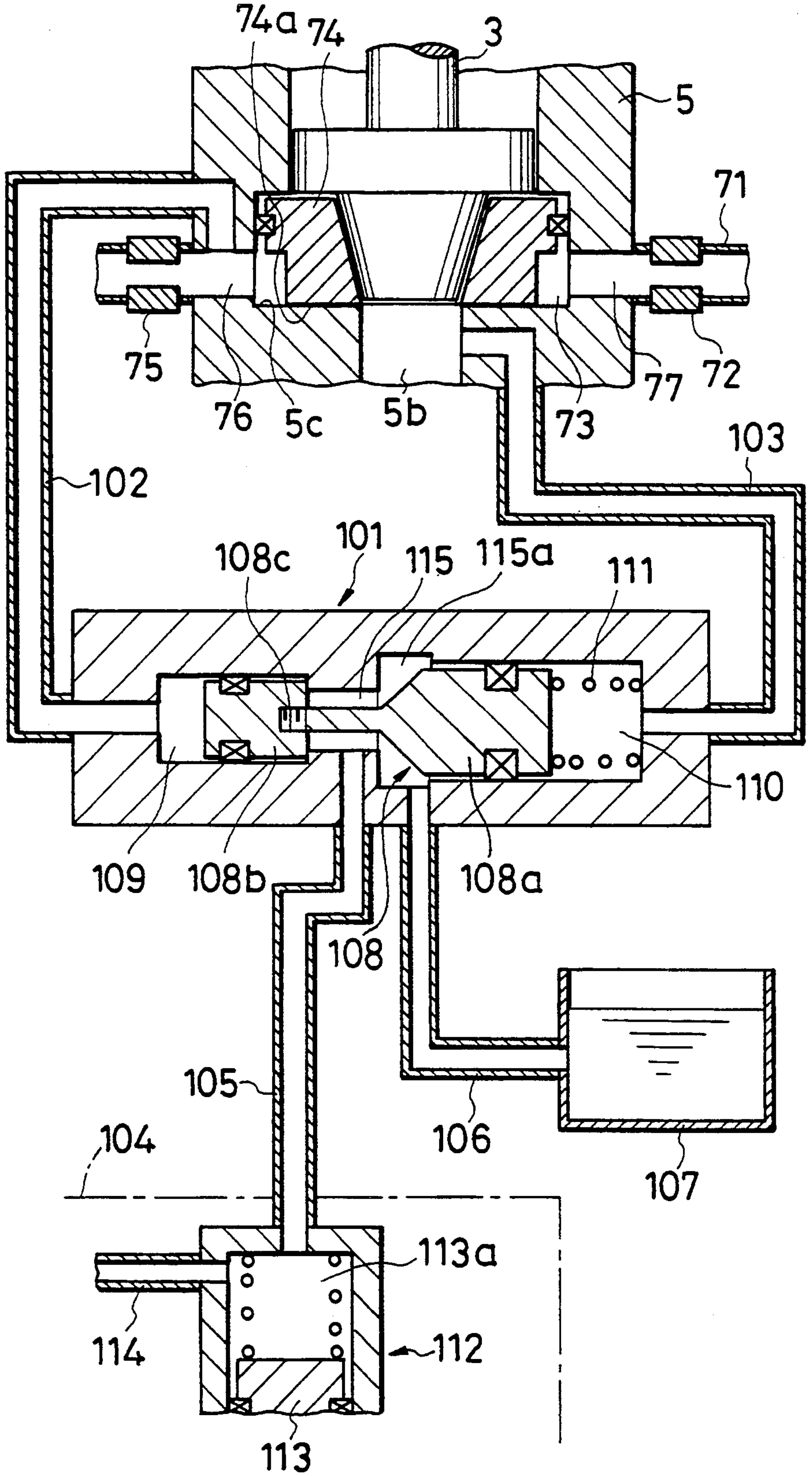
FIG. 5 is a sectional side view showing a detailed constitution of the sequential control valve in the second embodiment during the opening operation of the circuit breaker.

A second preferred embodiment of the sequential control valve 101 is shown in FIGS. 4 and 5. FIG. 4 is a sectional view showing a detail constitution of the sequential control valve 101 in a closing state of the circuit breaker. FIG. 5 is a sectional view showing the sequential control valve 101 in an opening operation of the circuit breaker. In comparison with the abovementioned first embodiment, the constitution of the switching valve 108 and the pressure chest is different and the others are substantially the same as those in the first embodiment.

In FIGS. 4 and 5, the switching valve 108 in the second embodiment consists of a first valve body 108*a* and a second valve body 108*b*. The first valve body 108*a* receives the pressure of the oil in the pressure chest 110 and the pressure of the oil in the switching valve chest 115. The second valve body 108*b* receives the pressure of the oil in of the pressure chest 109 and the pressure of the oil in the switching valve chest 115. In the assemblage, the first and the second valve bodies 108*a* and 108*b* are Joined by a screw 108*c*.

In the switching valve 108, pressure receiving area of the pressure chest 109 is designated by "Sa", pressure receiving area of the pressure chest 110 is designated by "Sb", pressure receiving area of the switching valve chest 115 facing to the second valve body 108*b* is designated by "Sc" and pressure receiving area of the switching valve chest 115 facing to the first valve body 108*a* is designated by "Sd", in the figure. The relations between the pressure receiving areas "Sa", "Sb", "Sc" and "Sd" are as follows:

"Sb">"Sa", "Sc">"Sd" and "Sa">("Sc"−"Sd").

Operation

Motion of the sequential control valve 101 of the second embodiment is described below. When the first hydraulic operation apparatus 4 is in the state of closing the circuit breaker, the pressure of the oil in the second pressure chest 5*b* of the cylinder 5 and the pressure of the oil in the pipe lines 76 and 77 are the same level. The switching valve 108 receives a force in lefthand in FIG. 4 owing to the difference of the pressure receiving areas, and thereby the oil pressure port 11Sa is closed. When the opening operation of the circuit breaker starts and the pressure of the oil in both of the second pressure chest 5*b* of the cylinder 5 and in the pipe lines 76 and 77 becomes lower level, the switching valve 108 receives a pressing force of the compression spring 111 in lefthand in the figure, and the oil-pressure port 115*a* is closed. Furthermore, under this state, the second hydraulic operation apparatus 104 still keeps the resister contact of the circuit breaker in the closed state, and the high pressure oil is supplied to the switching valve chest 115 through the pipe line 105. As a result, the oil-pressure port 115*a* is firmly closed, since the pressure in lefthand is applied to the switching valve 108 ownning to the relation of the pressure receiving areas "Sc">"Sd"

FIG. 5 shows the case where the opening operation of the differential piston 3 in the first hydraulic operation apparatus 4 is completed and the differential piston reaches the final position in the opening operation. Therein, the bottom face 74*a* of the dashpot ring 74 contacts the face 5c of the cylinder 5 tightly, and thereby the exhaustion of the high-pressure oil from the pipe lines 76 and 77 is stopped at a point of time f2 in the timing chart (f) in FIG. 6. The pressure of the oil in the pipe lines 76 and 77 rises at a point of time e2 in the timing chart (e) in FIG. 6 by the high-pressure oil supplied through the restrictor 75. Thereby, the pressure of the oil in the pressure chest 109 rises, and the difference between the pressure of the oil in the pressure chest 109 and that in the pressure chest 110 occurs. When a force generated by the pressure difference overcomes the force of the compression spring 111 and the force applied to the switching valve 108 by the oil pressure in the switching valve chest 115, the switching valve 108 starts to move rightward in FIG. 5 at a point of time g1 in the timing chart (g) of FIG. 6. The high-pressure oil in the switching valve chest 115 is exhausted to the lower pressure tank 107.

Other operations of the first and second hydraulic operation apparatuses 4 and 104 are substantially the same as those of the aforementioned first embodiment.

In the above-mentioned second embodiment, since the difference is provided between the pressure receiving areas of the valve bodies 108*a* and 108*b* in the switching valve chest 115 of the sequential control valve 101, the sequential control valve 101 does not erroneously even at a sudden pressure change or mechanical vibration at the start of the opening operation of the circuit breaker; and the circuit breaker is certainly opened.

Third Embodiment

Figure 7:
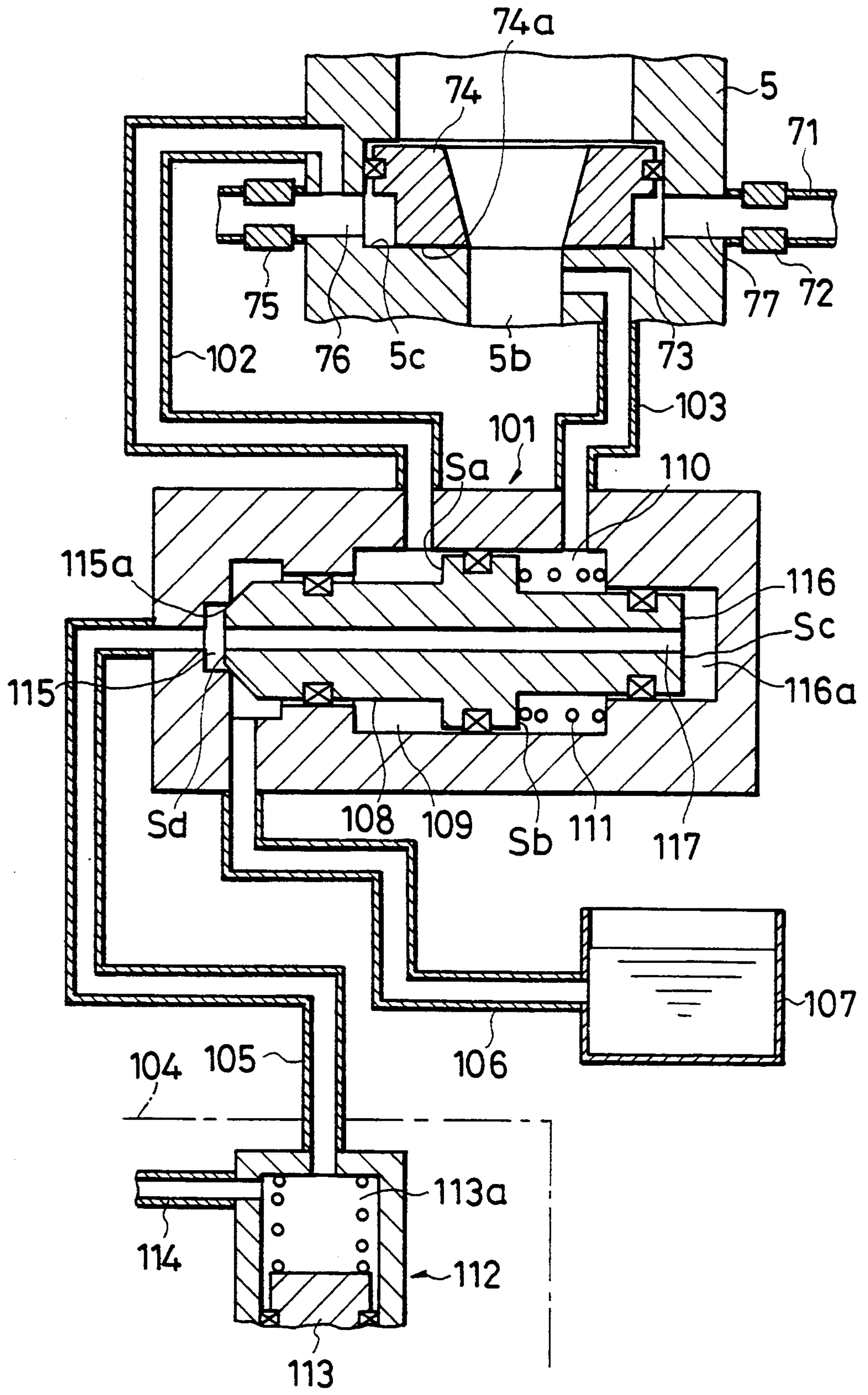
FIG. 7 is a sectional side view showing a detailed constitution of the sequence control valve in a third embodiment.

A third preferred embodiment of the sequential control valve 101 is shown in FIG. 7. In the third embodiment, the switching valve chest 115 is provided in the vicinity of an end of the sequential control valve 101, and the other elements designated by the same numerals are substantially the same as those of the abovementioned second embodiment. By having such configuration shown in FIG. 7, the oil pressure port 115*a* of the switching valve 108 which needs a precise machine work is easily finished. Furthermore, the pressure receiving face 116, which receives pressure of the oil in the switching valve chest 115 for closing the oil pressure port is resultantly provided in the vicinity of the other end of the sequential control valve 101. Therefore, it is necessary to provide a pipe line to introduce the oil to the pressure receiving face 116 from the switching valve chest 115. In the third embodiment, a through hole 117 is provided on the switching valve 108 in the axial direction thereof for communication between the switching valve chest 115 and a supplemental chest 116*a* which faces to the pressure receiving face 116.

With respect to the relations between the pressure receiving areas of the switching valve 108, when the pressure receiving area of the pressure chest 109 is designated by "Sa", that of the pressure chest 110 is designated by "Sb", that of the supplemental chest 116 is designated by "Sc" and that of the switching valve chest 115 is designated by "Sd" in FIG. 7, the areas are selected in a manner to be:

"Sb">"Sa", "Sc">"Sd" and "Sa">("Sc"−"Sd").

In the third embodiment configured above, fundamental operations of the sequential control valve 101 are substantially the same as those in the aforementioned second embodiment, and it operates the opening operation shown in the timing charts shown in FIG. 6.

Fourth Embodiment

Figure 8:
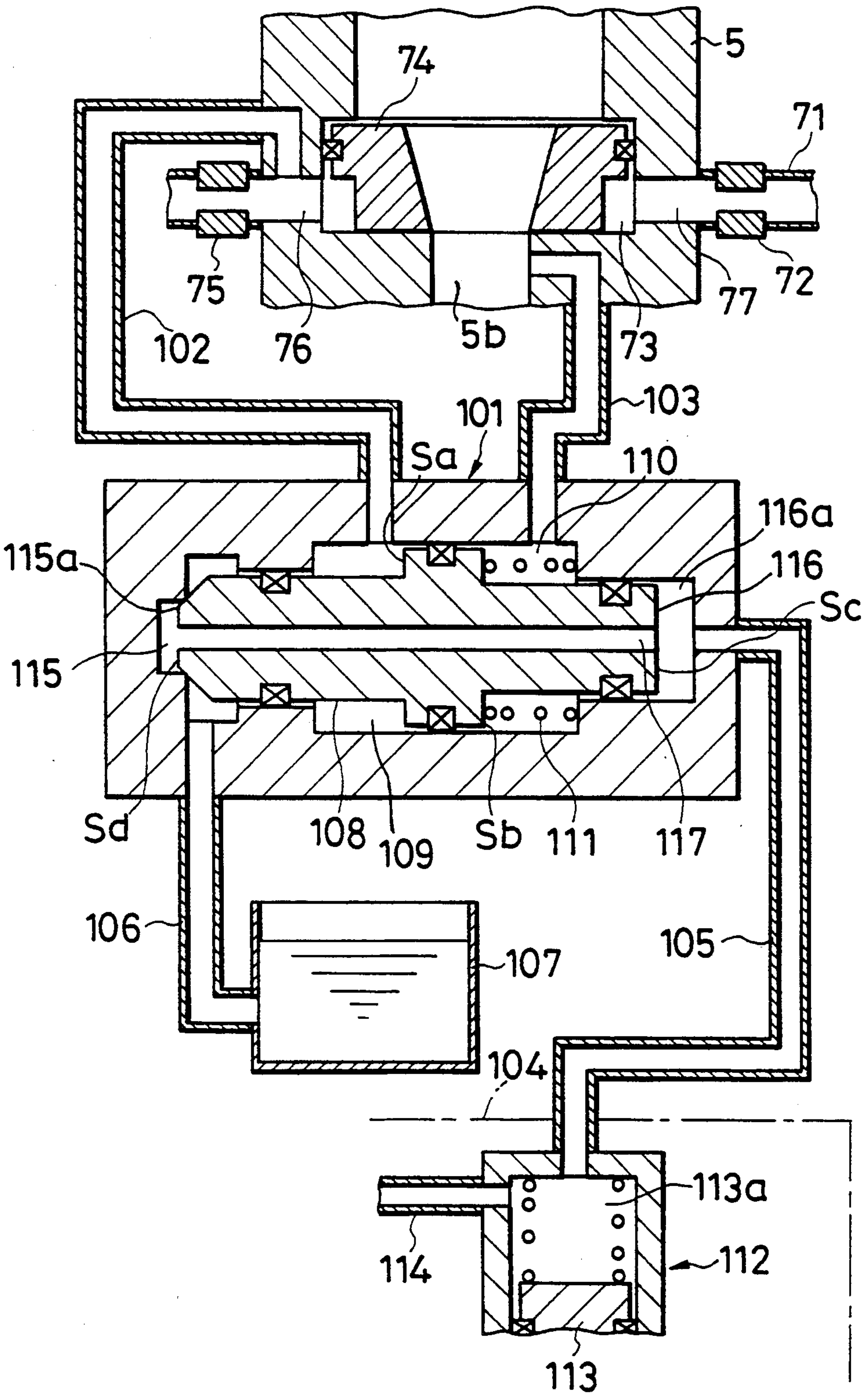
FIG. 8 is a sectional side view showing a detailed constitution of the sequence control valve in a fourth embodiment.

A fourth preferred embodiment of the sequential control valve 101 is shown in FIG. 8. Apart from the above-mentioned third embodiment shown in FIG. 7, wherein the pipe line 105 from the second hydraulic operation apparatus 104 is connected to the switching valve chest 115; in the forth embodiment shown in FIG. 8, the pipe line 105 from the second hydraulic operation apparatus 104 is connected to the supplemental chest 116*a* of the sequential control valve 101. Accordingly, a through hole 107 is provided on the switching valve 108 similarly to the third embodiment, for introducing the oil to the switching valve chest 115. Other constitutions and the motions in the fourth embodiment are substantially the same as those of the third embodiment.

In combination with the third embodiment and the fourth embodiment, a pair of pipe lines are provided on both sides of the sequential control valve 101, and one which is not used is closed by a cock. Thereby, the hydraulic operation apparatus has a freedom in layout of piping and the piping can be simplified.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A driving mechanism of a circuit breaker comprising:

(A) first and second hydraulic operation apparatuses for, respectively, driving a main contact and a resistor contact of said circuit breaker and having:
 an accumulator supplying a predetermined high-pressure oil;
 a driving device having a differential piston for driving said main contact or said resistor contact, a first pressure chest provided on a smaller piston area side of said differential piston whereto said high-pressure oil is always supplied and a second pressure chest provided on a larger piston area side of said differential piston;
 a main valve for controlling the pressure in said second pressure chest of said driving device; and
 a pressure discharge part disposed between a cylinder and a dashpot ring, whereto said high-pressure oil is always supplied from said accumulator; and (B) a sequential control valve provided between said first and second hydraulic operation apparatuses, said sequential control valve comprising control means for detecting the difference between said pressure of the oil in said pressure discharging part and that in said second pressure chest in said first hydraulic operation apparatus after discharging the pressure in said second pressure chest in said first hydraulic operation apparatus for moving said differential piston of said first hydraulic operation apparatus in a direction to open said main contact, and opening an oil-pressure port in said sequential control valve when the pressure in said second pressure chest becomes smaller than the pressure in said pressure discharging part of said first hydraulic apparatus, thereby in said second hydraulic operation apparatus, making a pressure in said second pressure chest of said driving device of said second hydraulic operation apparatus discharge for moving said differential piston of said second hydraulic operation apparatus in a direction to open said resistor contact.

2. A driving mechanism of a circuit breaker in accordance with claim 1, wherein:

said control means of said sequential control valve comprises: a first pilot chest whereto the oil pressure of said second pressure chest of said differential piston in said first hydraulic operation apparatus is supplied; a second pilot chest whereto the oil pressure of said pressure discharging part in said first hydraulic operation apparatus is supplied; a first valve body receiving the oil pressure in said first pilot chest; and a second valve body engaged with said first valve body, having a pressure receiving area smaller than that of said first valve body and receiving the oil pressure of the second pilot chest; wherein the oil pressure port opened when the driving force of said second valve body is larger than that of said first valve body.

3. A driving mechanism of a circuit breaker in accordance with claim 1, wherein:

said control means of said sequential control valve comprises: a first pilot chest whereto the oil pressure of said second pressure chest of said differential piston in said first hydraulic operation apparatus is supplied; a second pilot chest whereto the oil pressure of said pressure discharging part in said first hydraulic operation apparatus is supplied; a first valve body receiving the oil pressure in said first pilot chest; a second valve body engaged with said first valve body, having a pressure receiving area smaller than that of said first valve body and receiving the oil pressure of the second pilot chest, the oil pressure port being opened when the driving force of said second valve body is larger than that of said first valve body; and a switching valve chest provided between an inlet and an outlet of said oil pressure port and having a pressure receiving area which opposes to said first pilot chest smaller than a pressure receiving area opposing to said second pilot chest.

4. A driving mechanism of a circuit breaker in accordance with claim 2 or 3, wherein:

said first and second valve bodies are coupled by screws.

5. A driving mechanism of a circuit breaker in accordance with claim 1, wherein:

said control means of said sequential control valve comprises: a first pilot chest whereto the oil pressure of said second pressure chest of said differential piston in said first hydraulic operation apparatus is supplied; a second pilot chest whereto the oil pressure of said pressure discharging part in said first hydraulic operation apparatus is supplied; a first valve body receiving the oil pressure in said first pilot chest; a second valve body engaged with said first valve body, having a pressure receiving area smaller than that of said first valve body and receiving the oil pressure of the second pilot chest, the oil pressure port being opened when the driving force of said second valve body is larger than that of said first valve body; a first pressing part integrally provided on said first and second valve bodies for generating a driving force in a direction corresponding to the moving direction of said first valve body which receives a driving force in said first pilot chest; a second pressing part integrally provided on said first and second valve bodies for generating a driving force in a direction corresponding to the moving direction of said second valve body which receives a driving force in said second pilot chest, and having a pressure receiving area which is formed in said switching valve chest and is smaller than the pressure receiving area of said first pressing part; and a through hole provided on said first and second valve bodies for making the pressure in said first and second pressing parts the same.

* * * * *